United States Patent
Craig et al.

(10) Patent No.: US 7,920,168 B2
(45) Date of Patent: Apr. 5, 2011

(54) SYSTEMS AND METHODS OF CUSTOMIZING A COLOR PALETTE ON A DIGITAL CAMERA

(75) Inventors: Murray Dean Craig, Johnstown, CO (US); Robert P. Cazier, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1100 days.

(21) Appl. No.: 11/669,605

(22) Filed: Jan. 31, 2007

(65) Prior Publication Data

US 2008/0180533 A1    Jul. 31, 2008

(51) Int. Cl.
*H04N 5/225* (2006.01)
*G06K 9/00* (2006.01)
(52) U.S. Cl. .................. 348/207.99; 382/167
(58) Field of Classification Search .......... None
See application file for complete search history.

(56) References Cited

U.S. PATENT DOCUMENTS

| | | | |
|---|---|---|---|
| 5,311,212 A | 5/1994 | Beretta | |
| 5,341,464 A * | 8/1994 | Friedman et al. | 345/590 |
| 5,585,875 A * | 12/1996 | Imafuji et al. | 396/55 |
| 5,781,198 A | 7/1998 | Korn | |
| 6,366,316 B1 | 4/2002 | Parulski et al. | |
| 6,404,936 B1 | 6/2002 | Katayama et al. | |
| 6,430,355 B1 * | 8/2002 | Nagasawa | 386/52 |
| 6,529,202 B2 | 3/2003 | Wu | |
| 6,556,704 B1 | 4/2003 | Chen | |
| 6,952,286 B2 | 10/2005 | Luo et al. | |
| 7,024,054 B2 | 4/2006 | Cahill et al. | |
| 7,359,572 B2 * | 4/2008 | Liu et al. | 382/274 |
| 7,557,837 B2 * | 7/2009 | Takahashi | 348/223.1 |
| 2002/0031147 A1 * | 3/2002 | Anderson et al. | 370/487 |
| 2003/0151611 A1 | 8/2003 | Turpin et al. | |
| 2006/0066629 A1 | 3/2006 | Norlander et al. | |

* cited by examiner

*Primary Examiner* — Luong T Nguyen

(57) ABSTRACT

Systems and methods are disclosed for customizing a color palette on a digital camera. An exemplary method of customizing a color palette on a digital camera may comprise identifying for a user a color from a scene the digital camera is focused on. The method may also comprise capturing the color as a digital image on the digital camera. The method may also comprise adding the captured color to the color palette for the user to apply as a photo-editing effect to other digital images on the digital camera.

19 Claims, 4 Drawing Sheets

SYSTEMS AND METHODS OF CUSTOMIZING A COLOR PALETTE ON A DIGITAL CAMERA

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease.

The nature of digital cameras enables a number of features to be included for the user to edit his or her pictures directly on the camera itself. One such feature enables the user to add a color border to "frame" the picture. However, the user is typically limited to selecting the border from colors preloaded on the camera. If the user wants to use different color borders, the user typically needs to download the picture to a computer and use sophisticated photo-editing software.

DETAILED DESCRIPTION

Systems and methods are disclosed for customizing a color palette on a digital camera. In an exemplary embodiment, the user points the camera at an object (e.g., a hot air balloon) and captures a color from that object which is then added to the color palette on the camera and can be used for the border color. Accordingly, the user is provided with virtually limitless color possibilities. The user is able to point the camera at virtually any object and capture the color for use in the color palette. This also frees up camera memory (fewer or even no "canned" colors need to be pre-stored on the camera), and enables the user to be creative in generating and applying borders in an easy to implement user-interface.

Exemplary systems may be implemented as an easy-to-use user interface displayed on the digital camera and navigated by the user with conventional camera controls (e.g., arrow buttons and zoom levers already provided on the camera). The user needs little, if any, knowledge about photo-editing, and does not need special software for their PC. Accordingly, the user can be creative in generating and applying colors to their digital photographs directly on the camera itself.

Exemplary Systems

Figure 1:
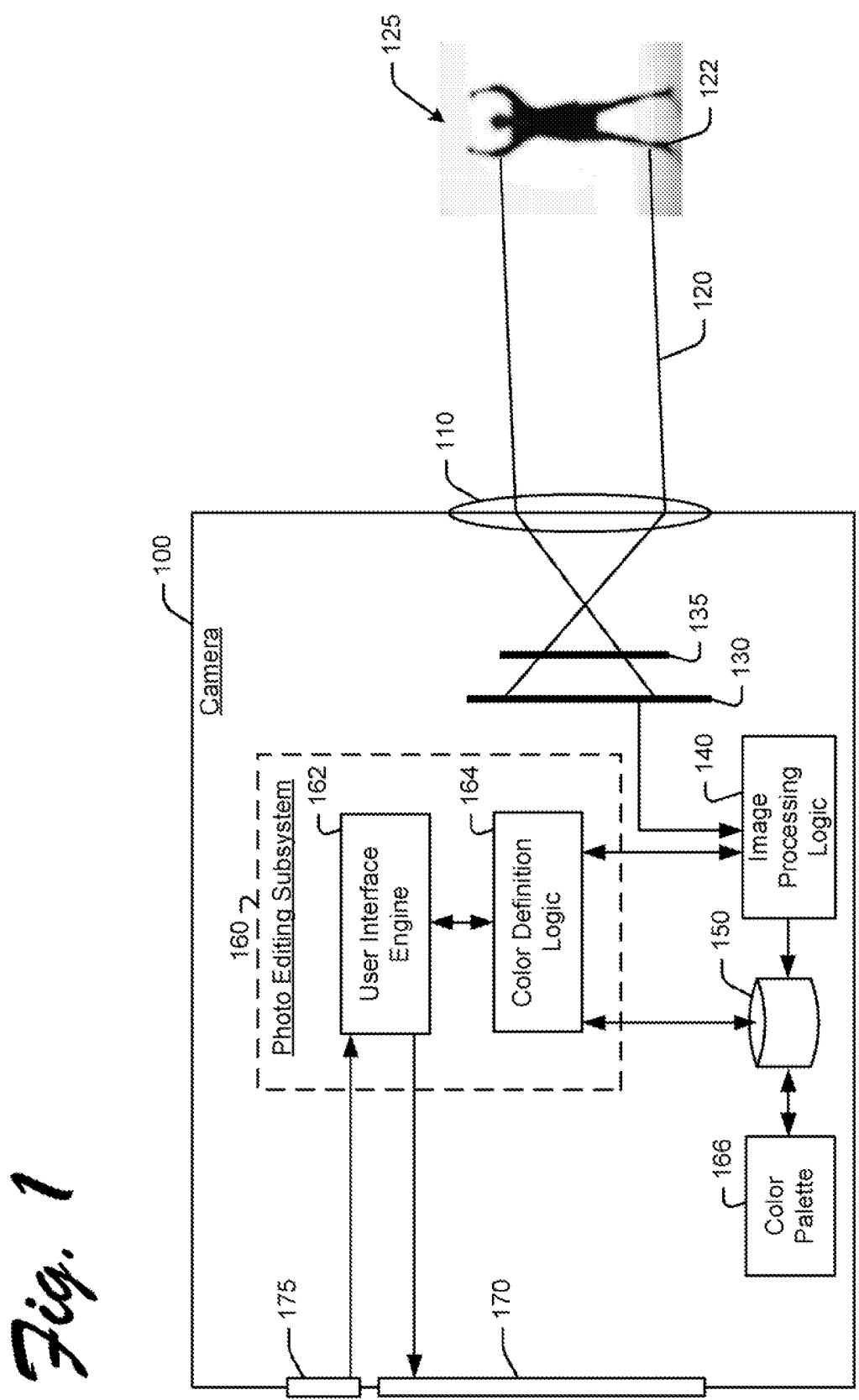
FIG. 1 is a block diagram of an exemplary camera system which may be implemented for customizing a color palette on a digital camera.

FIG. 1 is a block diagram of an exemplary camera system which may be implemented for customizing a color palette on a digital camera. The exemplary camera system may be a digital still camera or digital video camera (referred to herein as "camera") 100 includes a lens 110 positioned to focus light 120 reflected from one or more objects 122 in a scene 125 onto an image capture device or image sensor 130 when a shutter 135 is open (e.g., for image exposure). Exemplary lens 110 may be any suitable lens which focuses light 120 reflected from the scene 125 onto image sensor 130.

Exemplary image sensor 130 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125. The digital image may be stored in the camera's memory 150 (e.g., a removable memory card).

Shutters, image sensors, memory, and image processing logic, such as those illustrated in FIG. 1, are well-understood in the camera and photography arts. These components may be readily provided for digital camera 100 by those having ordinary skill in the art after becoming familiar with the teachings herein, and therefore further description is not necessary.

Digital camera 100 may also include a photo-editing subsystem 160. In an exemplary embodiment, photo-editing subsystem 160 is implemented in program code (e.g., firmware and/or software) residing in memory on the digital camera 100 and executable by a processor in the digital camera 100, such as the memory and processor typically provided with commercially available digital cameras. The photo-editing subsystem 160 may include user interface engine 162 and color definition logic 164 for customizing a color palette 166 in the digital camera (e.g., stored in memory 150).

The color definition logic 164 may also be operatively associated with the user interface engine 162 and the image processing logic 140 for capturing a desired color from the scene 125. User interface engine 162 may be operatively associated with a display 170 and one or more camera controls 175 already provided on many commercially available digital cameras. Such an embodiment reduces manufacturing costs (e.g., by not having to provide additional hardware for implementing the photo-editing subsystem 160), and enhances usability by not overwhelming the user with additional camera buttons.

During operation, the user interface engine 162 displays a menu on the digital camera (e.g., on display 170). In an exemplary embodiment, the menu may be accessed by a user selecting the "Design Gallery" menu option. The menu may then be navigated by a user making selections from any of a variety menus options. For example, the user interface engine 162 may receive input (e.g., via one or more of the camera controls 175) which enable a user to select a color in the scene 125 (e.g., from a preview image generated by the image processing logic 140).

Optionally, instructive text may also be displayed on display 170 for modifying, or accepting/rejecting the color. The instructive text may be displayed until the user operates a camera control 175 (e.g., presses a button on the digital camera 100). After the user operates a camera control 175, the text may be removed so that the user can better see the preview of the color and templates on display 170.

Also optionally, the user may operate camera controls 175 (e.g., as indicated by the instructive text) to modify the color. For example, the user may press the left/right arrow buttons on the digital camera 100 to change the color (e.g., adjust hue, brightness, color saturation, and/or other aspects of the color).

Color definition logic 164 may also be operatively associated with the memory 150 for accessing the color palette 166 and digital images stored in the memory 150. For example, the color definition logic may read the images from memory 150, apply a photo-editing effect to the image(s) using the color palette 166), and write the image with the applied photo-editing effect back to memory 150.

Before continuing, it is noted that the digital camera 100 shown and described above with a reference to FIG. 1 is merely exemplary of a camera which may be implemented for customizing a color palette. The systems and methods described herein, however, are not intended to be limited only to use with the digital camera 100. Other embodiments of cameras and/or systems which may be implemented for customizing a color palette are also contemplated.

Figure 2:
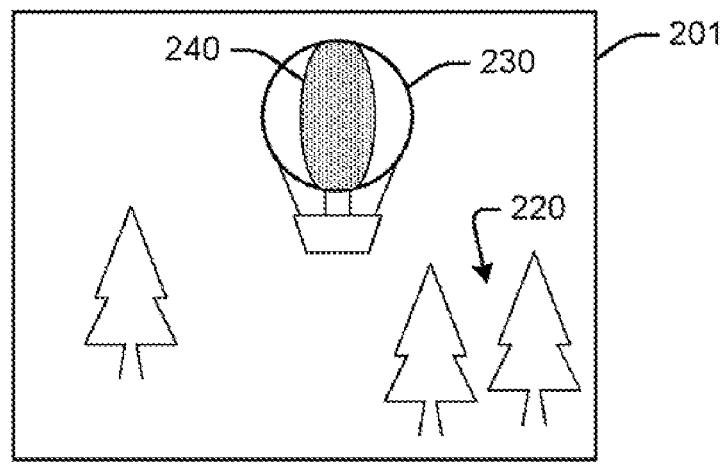
FIG. 2 are illustrations of digital images showing an exemplary embodiment for selecting a color for customizing a color palette on a digital camera.
Figure 2:
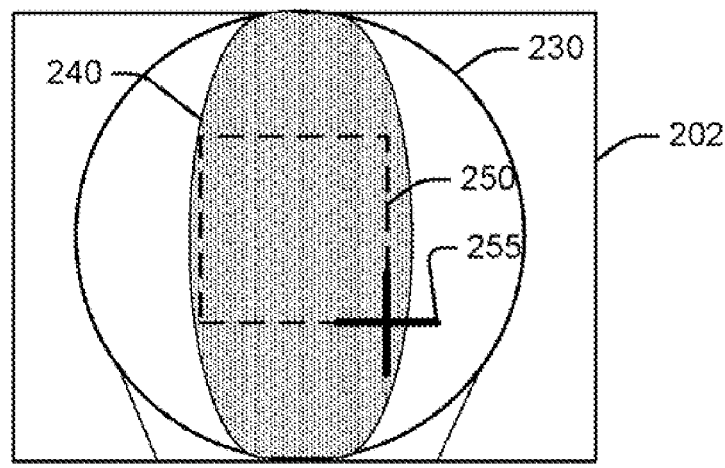
Figure 2:
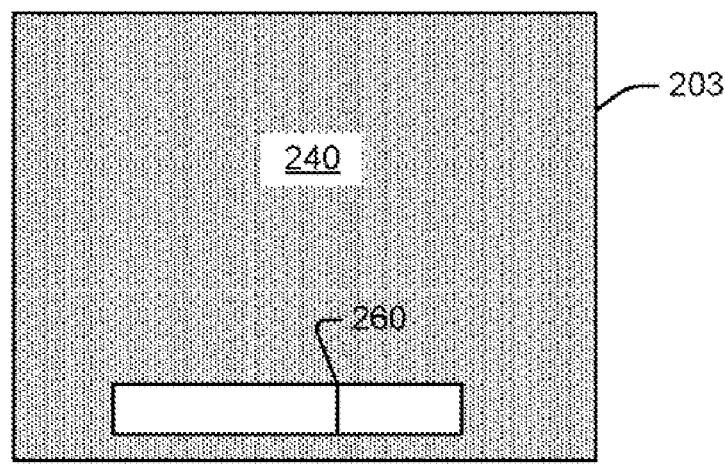

FIG. 2 are illustrations of digital images showing an exemplary embodiment for selecting a color for customizing a color palette on a digital camera. In an exemplary embodiment, the camera user captures a digital image 201 of a scene 210. The camera user may then select all or a portion of the scene 210 as the desired color. In this example, the scene includes trees 220 in the background, and a hot air balloon 230 having a color 240 that the user desires to add to the camera's color palette (e.g., color palette 166 in FIG. 1).

It is noted that the desired color 240 may be selected using any of a wide variety of techniques, now known or later developed. By way of example, the user may use the camera's zoom control (optical and/or digital zoom), as illustrated by digital image 202. Optionally, a selection tool 250 (e.g., a box or other shape and cross-hairs 255) may be displayed for the user on the camera display. The user may then use camera controls (e.g., up/down and right/left arrow buttons on the camera) to position the selection tool 250 in the scene 210 over the desired color 240. Optionally, the user may also use camera controls (e.g., the zoom lever) to increase/decrease the size of the selection tool 250.

In an exemplary embodiment, the desired color 240 is selected to fill the camera's entire display (e.g., display 170 in FIG. 1), as shown by image 203. Although this makes it easier for the user to see the color, this is not required. When the user has selected the desired color 240 from the scene, the desired color 240 may be captured as a digital image on the camera.

It is noted that sometimes the user may not be readily able to capture the desired color from a scene. For example capturing a specific part of a leaf could be difficult with hand shake, wind motion, etc. One way to solve this is a chrominance average of the selection box. In other words the entire scene all the way down to a selected region can be used to average. The average literally just takes the color components of all the pixels in the selected region and averages the colors together. As the selection box gets smaller and smaller to the area of interest, the color matches closer and closer.

In some circumstances, the user may want to capture a color to match or complement the image. Accordingly, the current averaged color may be previewed for the user on a portion of the camera display (e.g., as the border around the picture). This way the user can see variations in color as the camera is moved around and the algorithm constantly reapplies itself to come up with a new average. For example, in a scene with a yellow aspen tree and blue sky, the displayed color may start off bluish. After zooming in on the leaf (optical, digital, or framing technique) the border color transitions to the yellow of the leaf.

Also in some circumstances, the user may want to capture a color that contrasts with the image. In an exemplary embodiment, the contrasting color is automatically created and added to the palette when a color is captured, then when the user is looking through the color palette, the user can invert the previously captured colors. Alternatively, the user may select automatic contrast wherein an algorithm executing on the camera inverts the color in real-time and displays it to the user as the user is capturing the color. For example, the algorithm may analyze the selected color and then display the chromatically opposite color on the camera's display. In another example, the algorithm may use artistically opposite colors based on the color wheel (e.g., using geometric degrees on the color wheel) to show on the camera's display.

After selecting the color, the color may be artificially adjusted. As used herein, the term "artificially" means after the color has been captured on the camera as a digital image. In an exemplary embodiment, the color may be manually adjusted by the user. Various user options for artificially changing or "fine tuning" the desired color 240 may be provided to the user, e.g., through a menu system and/or graphical controls 260 displayed via the user interface on the digital cameras. For example, the user may adjust the hue, brightness, color saturation, and/or other aspects of the color to arrive at the desired color.

In another exemplary embodiment, the color may be automatically adjusted by the camera. For example, the color may be adjusted as a normal picture to compensate for lens and sensor anomalies. Channel balance gains, white balance conversions, shading compensation, tone maps may be applied as needed to obtain the "true" color. Alternatively, the image may be analyzed statistically to arrive at the "true" color. For example, the analysis may be biased to the center of the frame and optionally averaged and filtered over the range of the image. The result may be a color triplet (YCbCr or RGB), which can then be replicated as much as necessary to fill up the confirmation display for the user (e.g., image 203).

After the desired color 240 is approved by the user, the desired color 240 may be stored in the camera's memory. For example, the desired color 240 may be stored in the camera on a temporary, semi-permanent, or permanent basis. For example, the desired color 240 may be erased after its first use to preserve memory resources. Or for example, the desired color 240 may be stored indefinitely (e.g., until the user deletes the color from the color palette) for repeated use.

Figure 3:
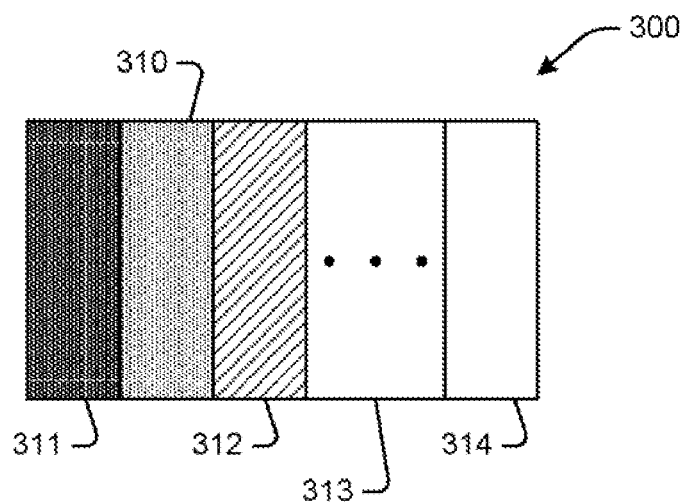
FIG. 3 is an illustration of an exemplary customized color palette on a digital camera.

FIG. 3 is an illustration of an exemplary customized color palette 300 on a digital camera. In an exemplary embodiment, the custom color 310 may be analyzed and stored in logical order in the color palette 300. In other words a current color palette is analyzed to determine the best location among existing colors 311-314 to insert the custom color 310 (e.g., nearest neighbor, color wheel, hue matching, saturation matching, brightness matching).

Optionally, names may be applied automatically or by the user so that the user can readily identify the custom color 310 in the custom color palette 300. The user may use a four-way rocker, a stylus or other interface device to select the desired color from the custom color palette 300 to apply as a photo-editing effect to one or more digital images stored on the camera.

Figure 4:
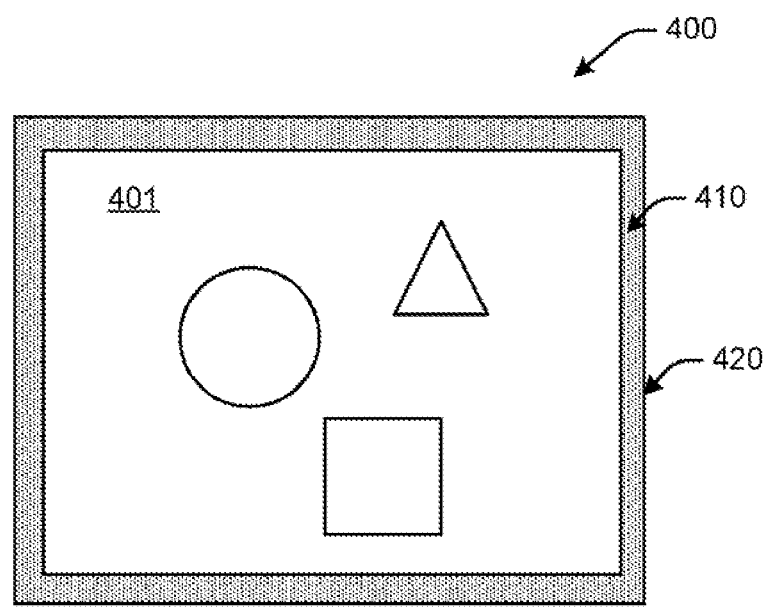
FIG. 4 is an illustration of a digital image showing an exemplary color selected from a customized color palette on a digital camera and applied to another digital image as a border effect.

FIG. 4 is an illustration of a digital image 400 showing an exemplary color 410 selected from a customize color palette (e.g., color palette 300 in FIG. 3) on a digital camera and applied to another digital image 401 (e.g., stored in camera memory 150 in FIG. 1) as a border effect 420.

There are a wide variety of techniques for adding borders to digital images. In an exemplary embodiment, the desired color is selected by the user from the custom color palette, and the digital image may be resized to fit over an image containing only the desired color to create the border 420. Alternatively, the border 420 may include the custom color only around the edges and be overlaid onto the digital image, thereby cropping a portion of the original digital image.

It is noted that other techniques for adding a border effect to digital images are also contemplated. It is also noted that the custom color palette may be used for any of a wide variety of different types of photo-editing effects, and is not limited to applying borders to digital images.

Still other embodiments are also contemplated for customizing a color palette on a digital camera as well as readily appreciated by those having ordinary skill in the art after becoming familiar with the teachings herein.

Exemplary Operations

Exemplary operations which may be used for customizing a color palette on a digital camera may be embodied as logic instructions on one or more computer-readable medium. When executed on a processor (e.g., in the camera), the logic instructions implement the described operations. In an exemplary embodiment, the components and connections depicted in the figures may be implemented.

Figure 5:
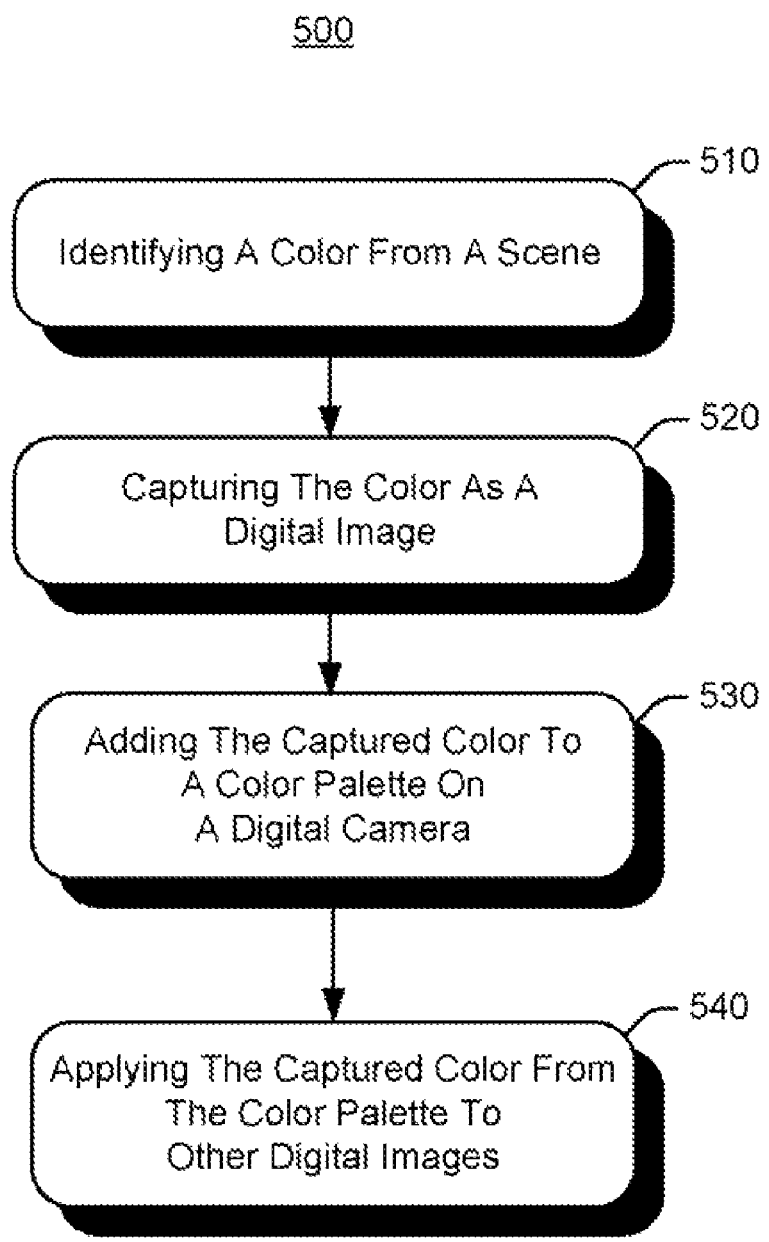
FIG. 5 is a flowchart illustrating exemplary operations for customizing a color palette on a digital camera.

FIG. 5 is a flowchart illustrating exemplary operations for customizing a color palette on a digital camera. In operation 510, a color is identified from a scene. For example, the user may point the camera at an object in the scene and then zoom in on the desired color. Optionally, the user may use a selection box to select a color within the image being displayed on the camera display, e.g., if the user is unable to fill the entire camera display with the desired color.

In operation 520, the color may be captured as a digital image on the camera. Optionally, the camera may automatically adjust the color artificially. For example, the camera may apply channel balance gains, white balance conversions, shading compensation, or tone adjustments to compensate for lens and sensor anomalies. Also optionally, the user may manually adjust the color artificially. For example, the user may be provided with various tools to adjust the hue, brightness, color saturation, and/or other aspects of the color to arrive at the desired color.

In operation 530, the captured color may be added to a color palette on the digital camera, thereby creating a custom color palette. Optionally, the user may select to have the custom color temporarily or permanently added to the custom color palette. For example, the user may add the desired color to the custom color palette temporarily for application to one or more digital images. After application, the desired color may be deleted from the camera's memory. Or for example, the user may add the custom color to the custom color palette on a permanent or semi-permanent basis so that it can be used or reused at a later time.

In operation 540, the captured color from the custom color palette may be applied to other digital images stored on the camera. For example, the custom color palette may be applied as a border effect, as a background, or other photo-effect.

Other operations, not shown, are also contemplated and will be readily apparent to those having ordinary skill in the art after becoming familiar with the teachings herein. For example, the custom color may be displayed for the user to approve before being stored in the custom color palette.

Accordingly, only approved colors are added to the custom color palette and are otherwise deleted to free memory if the user decides that they do not like the color.

It is noted that the exemplary embodiments shown and described are provided for purposes of illustration and are not intended to be limiting. Still other embodiments of customizing a color palette on a digital camera are also contemplated.

The invention claimed is:

1. A method of customizing a color palette on a digital camera comprising:
   identifying for a user a color from a scene the digital camera is focused on;
   capturing the color as a digital image on the digital camera; and
   adding the captured color to the color palette as a custom color for the user to apply the captured color from the color palette as part of a photo-editing effect to other digital images on the digital camera.

2. The method of claim 1 wherein identifying the color from the scene is at least by using zoom controls on the digital camera.

3. The method of claim 1 wherein identifying the color from the scene is at least by using a selection tool on the digital camera.

4. The method of claim 1 further comprising artificially adjusting characteristics of the color after capturing the color as the digital image.

5. The method of claim 4 wherein artificially adjusting characteristics of the color is by the digital camera and automatically corrects for anomalies in lens and sensor that change appearance of the color shown on the digital camera from a true color seen without the digital camera.

6. The method of claim 1 further comprising artificially adjusting characteristics of the color before adding the captured color to the color palette.

7. The method of claim 1 wherein the photo-editing effect is a color border using the custom color from the color palette.

8. The method of claim 1 further comprising logically ordering the captured color among other colors already in the color palette.

9. The method of claim 1 further comprising naming the color in the color palette after adding the captured color to the color palette.

10. A digital camera comprising:
    image processing logic executing in the digital camera to display a preview image of a scene;
    color definition logic operatively associated with the image processing logic to identify a desired color from the scene and then capture the desired color as an image on the digital camera;
    a color palette stored in memory on the digital camera to store the desired color for customizing the color palette on the digital camera in color-order among other colors already in the color palette.

11. The digital camera of claim 10 further comprising a user interface engine operatively associated with the color palette to apply the desired color as a colored border to other digital images stored in the memory on the digital camera.

12. A camera system comprising:
    means for identifying a color from a scene;
    means for capturing the identified color as a digital image;
    means for adding the captured color to a color palette on a digital camera for customizing the color palette; and
    means for logically ordering the captured color among other colors already in the color palette.

13. The camera system of claim 12 further comprising means for applying the captured color from the color palette to other digital images as a border.

14. The digital camera of claim 10 wherein the color definition logic is configured to take a chrominance average of a color displayed by a selection tool to identify the desired color from the scene, the desired color being the chrominance average.

15. The digital camera of claim 10 wherein the image processing logic is to preview the desired color in real-time as a border around the preview image of the scene so that the desired color changes as a selection tool identifies different colors from the scene.

16. The digital camera of claim 10 wherein the color definition logic is to invert the desired color to display a chromatically opposite color from the desired color, wherein both the desired color and the chromatically opposite color are added to the color palette.

17. The digital camera of claim 16 wherein the color definition logic is to bias to the center of a selection tool to identify the desired color.

18. The digital camera of claim 17 wherein the color definition logic is to average and filter a color previewed over a range of the selection tool.

19. The digital camera of claim 18, wherein a result from averaging and filtering is a color triplet, the color triplet replicated to fill up a confirmation display for a user.

* * * * *